(No Model.)

M. HALL & J. C. RYAN.
THILL COUPLING.

No. 324,837.  Patented Aug. 25, 1885.

WITNESSES:
Otto Berger
C. Sedgwick

INVENTOR:
M. Hall
J. C. Ryan
BY Munn & Co.
ATTORNEYS.

UNITED STATES PATENT OFFICE.

MAJOR HALL AND JOHN C. RYAN, OF ST. PAUL, MINNESOTA.

THILL-COUPLING.

SPECIFICATION forming part of Letters Patent No. 324,837, dated August 25, 1885.

Application filed December 10, 1884. (No model.)

*To all whom it may concern:*

Be it known that we, MAJOR HALL and JOHN C. RYAN, of St. Paul, in the county of Ramsey and State of Minnesota, have invented a new and Improved Anti-Rattling Packing for Thill-Connections, of which the following is a full, clear, and exact description.

The object of our invention is to provide for the increased durability of the elastic packings or deadeners usually placed between the vehicle-axle and the thill-irons, and to provide for taking up any slackness in the joints to free the thill-connections from annoying rattling of the parts.

The invention consists in a packing for thill-connections formed of an inner elastic block or deadener and an outer metallic casing, together with a clamping or adjusting screw, said parts being of such construction and arrangement as shall cause a vertical compression of the elastic packing by the casing to elongate the packing so it shall take up the wear of the parts, and at the same time be preserved in its original shape at the forward end, all as hereinafter fully described and claimed.

Reference is to be had to the accompanying drawings, forming part of this specification, in which similar letters of reference indicate corresponding parts in both the figures.

Figure 1:
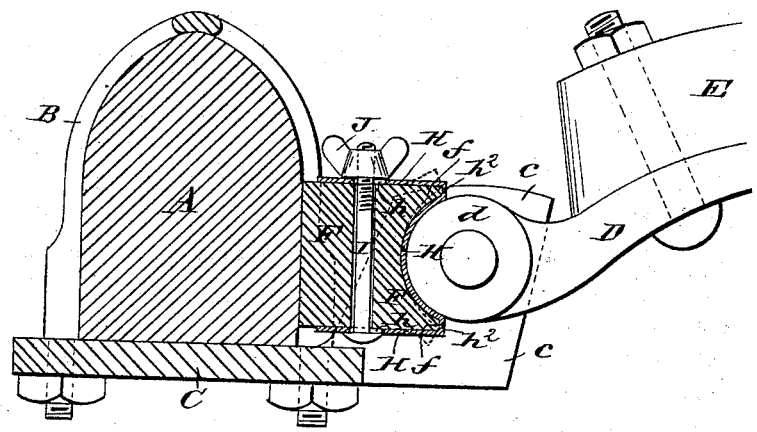
Figure 2:
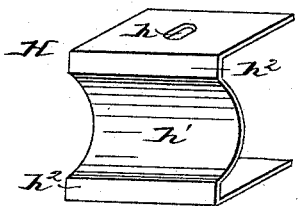

Figure 1 is a sectional side elevation of the axle and thill connection of a vehicle with my improvement applied, and Fig. 2 is a front perspective view of the casing of the packing or deadener.

The letter A indicates the axle of a vehicle, and B is a clip which binds to the axle the plate C, having lugs $c$, between which the thill-iron D, connected to the thill E, is pivoted in the usual manner, and F indicates the elastic packing or deadener, which usually consists of a block of rubber, which is interposed between the eye $d$ of the thill-iron and the axle to prevent noisy rattling of the thill-connections, more especially when the vehicle is traveling over rough roads.

When the rubber packings F alone are used, the upper and lower thin lip portions, $ff$, of the packings are pressed back or outward from the eyes of the thill-irons by the constant working or rocking pressure of the eyes, and as indicated in dotted lines in Fig. 1, and when in this condition the effectiveness of the elastic packing is greatly impaired, as its surface bearing on the thill-iron is materially reduced, and the elastic qualities of the packing are not fully availed of—in other words, the packing spreads vertically at the front next to the eye of the thill-iron, instead of expending its elastic force in a direct line between the vehicle-axle and the eye of the thill-iron, as it should do.

In carrying out our invention we fit a metal casing, H, upon the front and upper and lower faces of the elastic packing F, and hold said casing to the packing preferably by a headed bolt, I, passed through longitudinally-ranging slots $h\ h$ in the upper and lower parts or wings of the casing and through the packing, said bolt receiving a nut, J, on its threaded end, by which to bind the casing H firmly to the packing, and compress it vertically from time to time, to expand it horizontally by such compression, so that the packing will always fill the space between the casing H and the axle to hold the curved part $h'$ of the casing snugly to the eye of the thill-iron, the slots $h\ h$ in the casing allowing play of the bolt I to compensate for any variation in the length of the elastic packing F caused by the compression of it by the bolt and casing.

It will be seen that the upper and lower shoulders or points, $h^2\ h^2$, of the casing H inclose the thin lip portions $ff$ of the packing and prevent their distension or spreading, while said lips always fill the space behind the shoulders $h^2\ h^2$ and tend to keep them to their original shape, also to insure the snug bearing of the entire curved surface $h'$ of the casing on the eye of the thill-iron and give a more substantial backing to the thill-iron than the elastic packing alone could do under any circumstances.

It is evident that the casing or guard-plate H increases the durability of the rubber packing F by preventing its distension vertically, and also by covering the parts of the packing most exposed in the common construction to the friction of the thill-iron, and the casing also largely protects the packing from weather influences—such as alternate wettings and dryings—which have a well-known destructive effect on rubber or its compounds. Furthermore, our improved packing may cheaply be made and applied, and does not mar the appearance of adjacent parts of the vehicle.

We prefer to make the casing H of steel; but any other suitable metallic or other substance may be used for the purpose.

Having thus fully described our invention, we claim as new and desire to secure by Letters Patent—

1. The combination, with a thill-connection, of the elastic packing F and a casing, H, having the curved face $h'$, shoulders or points $h^2$ $h^2$, inclosing the lips $f f$ of the packing, and an open back, together with means for attaching the casing to the packing, whereby the packing may be compressed vertically and elongated horizontally, as herein set forth.

2. The combination, with a thill-connection, of the elastic packing F, the casing H, having a curved face, $h'$, shoulders or points $h^2$ $h^2$, inclosing the lips $f f$ of the packing, and an open back, together with the bolt I, passed through slots $h$ $h$ of the casing and through the packing, and provided with a nut, J, substantially as herein set forth.

3. As an improved article of manufacture, the open back casing, H, made with curved face $h'$, shoulders or points $h^2$ $h^2$, and opposite slotted wings, all made in one piece, as set forth.

MAJOR HALL.
JOHN C. RYAN.

Witnesses:
A. V. TEEPLE,
W. W. GRISWOLD.